United States Patent Office 3,533,607
Patented Oct. 13, 1970

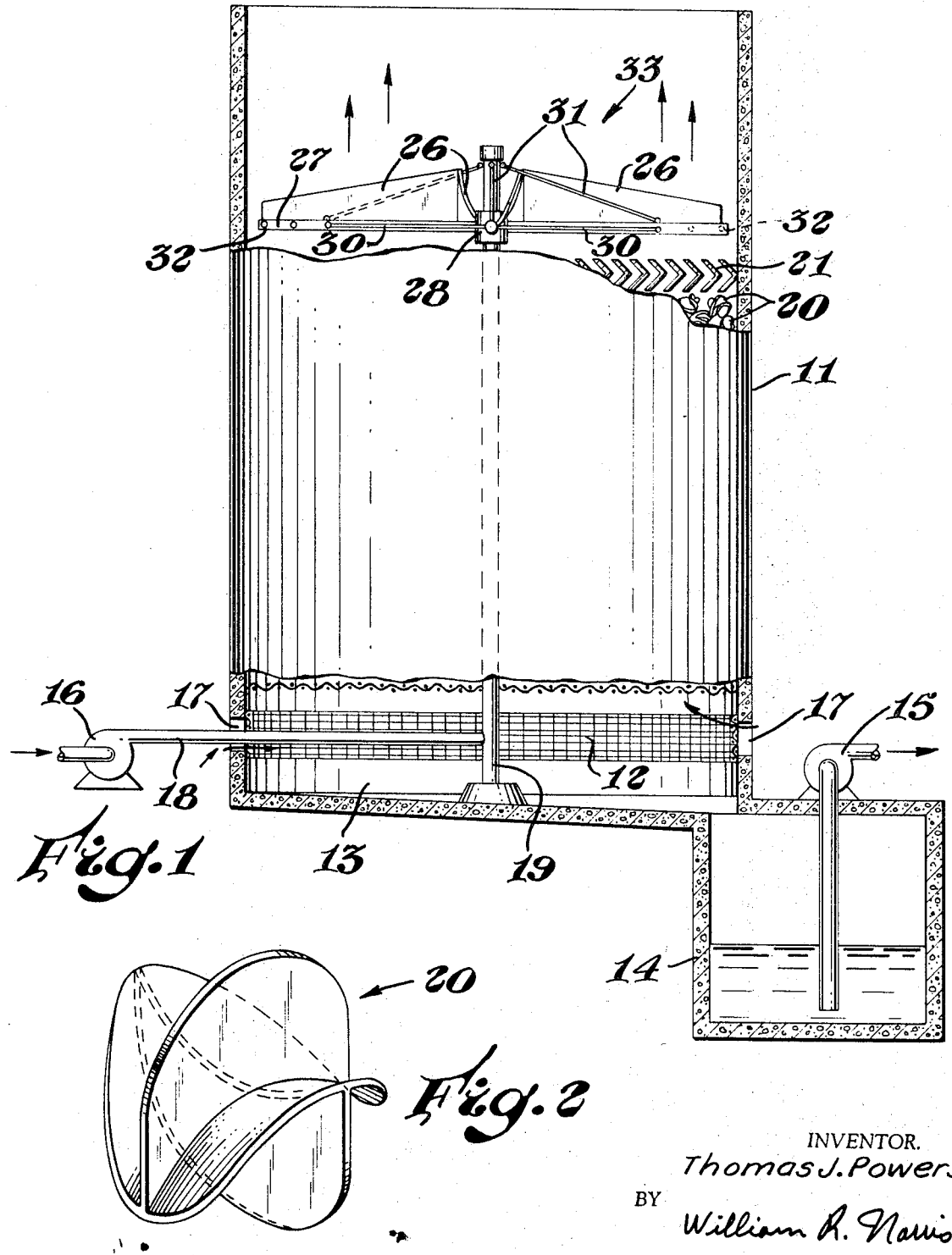
INVENTOR.
Thomas J. Powers
BY William R. Norris
ATTORNEY

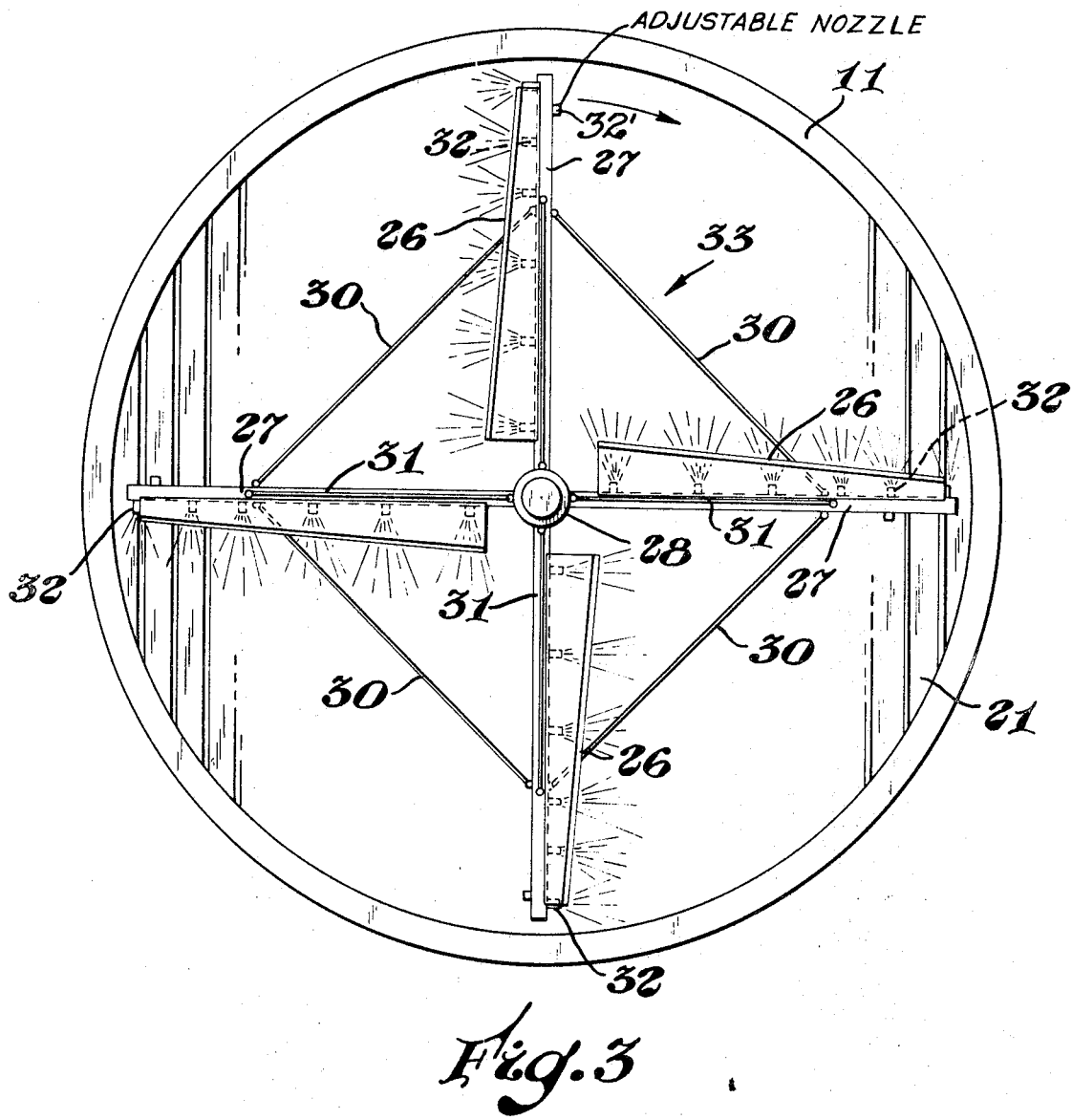

3,533,607
COOLING TOWER WITH NEW LIQUID DISTRIBUTION AND DRAFT INDUCING MEANS
Thomas J. Powers, Midland, Mich., assignor to The Dow Chemical Company, Midland, Mich., a corporation of Delaware
Filed July 11, 1968, Ser. No. 744,097
Int. Cl. B01d 47/16
U.S. Cl. 261—25    4 Claims

ABSTRACT OF THE DISCLOSURE

Cooling towers in which liquid is cooled by gravitating over splash surfaces countercurrent to a stream of air are constructed with unitized liquid distributing-draft inducing means. Such means are provided in the form of at least one rotatable arm having a series of openings along one side, which convert pressurized liquid into jet power with a net driving force in a horizontal plane, and air moving vanes mounted in a fixed relationship to said rotatable arms. The size and inclination of the vanes are readily varied in relation to the net driving force of the liquid jets. Such force may be adjusted by rotation of the jets in a vertical plane, by control of liquid flow rates, or the utilization of adjustable reverse thrust jets, to provide control of relative liquid and air flow rates over wide ranges. A major advantage of this system is the uniform draft that can be achieved by having the draft generating vanes rotating over the entire splash packing.

---

The present invention relates generally to cooling towers and their mode of operation. Although adaptable for cooling any liquid by gas-liquid contact, the described method is particularly well suited for cooling water.

In the development of the cooling tower art, there have been numerous innovations directed to the utilization of the pressure of the water to be cooled in motivating draft inducing means. Exemplary of such developments are U.S. Pat. 621,718; 976,246; 2,672,328 and 3,253,819. The approach of the prior art, as illustrated by the aforementioned patents, has been generally to utilize jets of the warm water to drive turbines. These, in turn, operate air fans and/or water distributing impellers. The problem of redistributing water, the energy of which has been dissipated in a turbine, requires special techniques and apparatus to achieve uniform distribution of the liquid over the surface of the tower splash packing.

One object of the instant invention is to provide a new construction for cooling towers, and especially to provide cooling towers with unitized draft inducing and liquid distributing means. More particularly, it is an object to efficiently utilize water pressure to achieve the foregoing objects. Further objects are to provide a liquid cooling process with flexible controls for the regulation of relative liquid and air flow rates in cooling towers. A still further object is to provide a uniform draft throughout the tower packing.

In the accompanying drawings, FIG. 1 is an elevation of a cooling tower embodying a unitized distributing and draft inducing means of the instant invention.

FIG. 2 depicts one type of splash medium or packing suitable for water cooling towers.

FIG. 3 is a plan view of the cooling tower showing a unitized liquid distributing and draft inducing means.

Shown in FIG. 1 is a vertically positioned cooling tower housing 11 containing a dump splash packing 20 to provide the necessary splash surface for counter-current contacting air upflow with liquid downflow. Air enters the tower housing 11 through inlet 17. This is generally disposed around the circumference of the tower housing 11 near its bottom and is protected by means of a screen 12. Below the housing 11 is positioned a liquid collecting basin 13 which discharges into a sump 14. The sump is emptied of cooled liquid by pump 15.

Liquid to be cooled enters the tower under pressure from pump 16 through inlet 18. It is forced through stand pipe 19 to the distributing hub manifold 28, through which it passes into distributing arms 27. Distribution over the liquid entrainment baffles 21 and then to the splash medium 20 is effected through jet nozzles 32 generally disposed on one side of the distributing arms 27 so as to produce, when flowing liquid, a net driving force in a horizontal plane. Secured to the distributing arms 27 are air vanes 26 inclined so as to produce an upward draft when the arms 27 are rotated in a clockwise direction. In the embodiment shown, the air vanes 26 are rigidly secured to the distributing arms 27, but a flexible attachment to permit changes in their inclination is also possible. The inclination of the vanes to the horizontal plane is adjusted according to desired air velocity. The distributing arms 27 are laterally braced by means of stringers 30 and, in a vertical plane, suspended by means of stringers 31.

FIG. 2 depicts a splash medium 20 of the dump packing type. Other kinds of suitable dump packing are taught in U.S. Pats. 1,796,501; 2,212,932; 2,602,651 and 2,639,909. Fabricated or decked media can also be used. Such media comprise a symmetrically positioned array of inclined surfaces disposed so as to break up impinging liquid into multiple streams or droplets. Examples are depicted and described in U.S. Pats. 2,672,328 and 3,141,909.

In FIG. 3, the unitized distributing and draft inducing means 33 is shown in plan view to illustrate the disposition of jet nozzles 32.

When in operation, liquid to be cooled is forced by means of pump 16 through the stand pipe 19. It is then directed by the hub manifold 28 into the four illustrated distributing arms 27. The jet nozzles 32 on the arms 27 are so directed to produce a net driving force in one direction causing the unitized distributing and draft inducing means 33 comprising the arms 27 attached to the rotating hub manifold 28 to rotate in a given direction. The illustrated air vanes 26 increase in size from the outward to the inward direction in proportion their draft inducing capacity. Their r.p.m. is controlled by the pressure on the liquid supplied by pump 16. Increases in this pressure increase liquid velocity from the distributing jet nozzles 32 and thus the amount of draft through the tower.

In the above manner, each of the conditions essential to a cooling tower are achieved in an effluent manner. These are uniform distribution of the liquid to be cooled over the tower splash medium 20 and provision of a countercurrent draft as depicted by the upflow arrows in the drawing.

In another operating mode, the distribution arms 27 are adapted by suitable means to rotate in the manifold hub 28 thus changing the direction of the liquid jets 32. As its direction varies within the quadrant from horizontal to vertical, an almost infinite variation in fan driving force can be acheved. In still another mode of operation, reverse jets may be placed on the opposite side of the distributing arm 27 to produce a braking force. In this latter case, one orifice 32' of adjustable cross section oriented oppositely to the driving jets, at the tip or near the end of a distributing arm, should be sufficient to provide variable braking resistance and thus variability in the rate of rotation.

The jet openings 32 in the distributing arms 27 can be simple orifices or holes in a pipe constituting the distributing arms 27. Optionally, and when increased conversion of pressure to velocity is desired, these openings 29 may be small nozzles, preferably nozzles of adjustable cross section.

What is claimed is:

1. A liquid cooling tower comprising a vertically positioned housing having an air inlet at the bottom and outlet at the top and having liquid collecting means positioned at the bottom of the housing, said housing containing between said inlet and outlet a splash medium for the countercurrent contacting of liquids and gases and above said medium a unitized liquid distributing and draft inducing means rotatably mounted and having connecting means to receive liquid to be cooled, said unitized, liquid distributing and draft inducing means comprising at least one distributor arm having a series of openings disposed along one side thereof and an orifice of adjustable cross section on the opposite side to said openings and near the end of said distributor arm and, in fixed driving relationship to said arm, an air vane adjustable in inclination from horizontal and inclined so as to induce a stream of air upwardly through the housing when driven by liquid flowing from the openings in the distributor arm.

2. A liquid cooling tower as in claim 1 wherein the cross section of the series of openings in the rotatable arm is adjustable.

3. A liquid cooling tower as in claim 1 wherein the distributor arm is rotatably mounted in a manifold hub.

4. A liquid cooling tower as in claim 1 wherein the splash medium is a dump-type packing.

References Cited

UNITED STATES PATENTS

| | | | |
|---|---|---|---|
| 2,403,695 | 7/1946 | Walker | 261—95 |
| 2,695,773 | 11/1954 | McGrath | 261—25 |
| 3,114,786 | 12/1963 | Macrow et al. | 261—112 X |
| 3,215,274 | 11/1965 | Schreiber | 210—150 |

FRANK W. LUTTER, Primary Examiner

S. H. MARKOWITZ, Assistant Examiner

U.S. Cl. X.R.

261—88, 96, 98, 118